March 21, 1933.  H. L. JOHNSTON ET AL  1,902,506
FOOD HANDLING APPARATUS
Filed July 19, 1929   3 Sheets-Sheet 1

INVENTORS
Herbert L. Johnston &
David A. Meeker
BY maréchal & Noé
ATTORNEYS

March 21, 1933.  H. L. JOHNSTON ET AL  1,902,506
FOOD HANDLING APPARATUS
Filed July 19, 1929  3 Sheets-Sheet 3

INVENTORS.
Herbert L. Johnston +
BY David A. Meeker
Maréchal & Noé
ATTORNEYS

Patented Mar. 21, 1933

1,902,506

UNITED STATES PATENT OFFICE

HERBERT L. JOHNSTON AND DAVID A. MEEKER, OF TROY, OHIO, ASSIGNORS TO THE HOBART MANUFACTURING COMPANY, OF TROY, OHIO, A CORPORATION OF OHIO

FOOD HANDLING APPARATUS

Application filed July 19, 1929, Serial No. 379,426, and in France February 2, 1929.

This invention relates to food handling machines, and more particularly to peeling machines adapted to remove the skins from vegetables and the like.

One of the principal objects of this invention is to provide a machine of this character having highly effective means for causing desired circulating movement of vegetables and the like within the machine and which gives a uniform and economical peeling action.

Another object of the invention is to provide a machine of this character which is simple in construction, highly efficient in operation, has long life, is sanitary and easily cleaned, and is constructed to minimize liquid leakage from the machine, and to provide thorough lubrication for and prevent the ingress of water into the bearings, motor and driving interconnections.

Still another object of the invention is to provide a machine of this character which is constructed to effectively secure the discharge of peelings and refuse from the machine without danger of clogging, and to remove such peelings and refuse from the flushing liquid to prevent clogging of drains.

Other objects and advantages of the invention will be apparent from the following description, the accompanying drawings and appended claims.

In the drawings in which like characters of reference designate like parts throughout the several views thereof, Fig. 1 is a front elevation of the peeling machine with parts broken away and in section on substantially the plane of the line 1—1 of Fig. 2;

Figure 1:
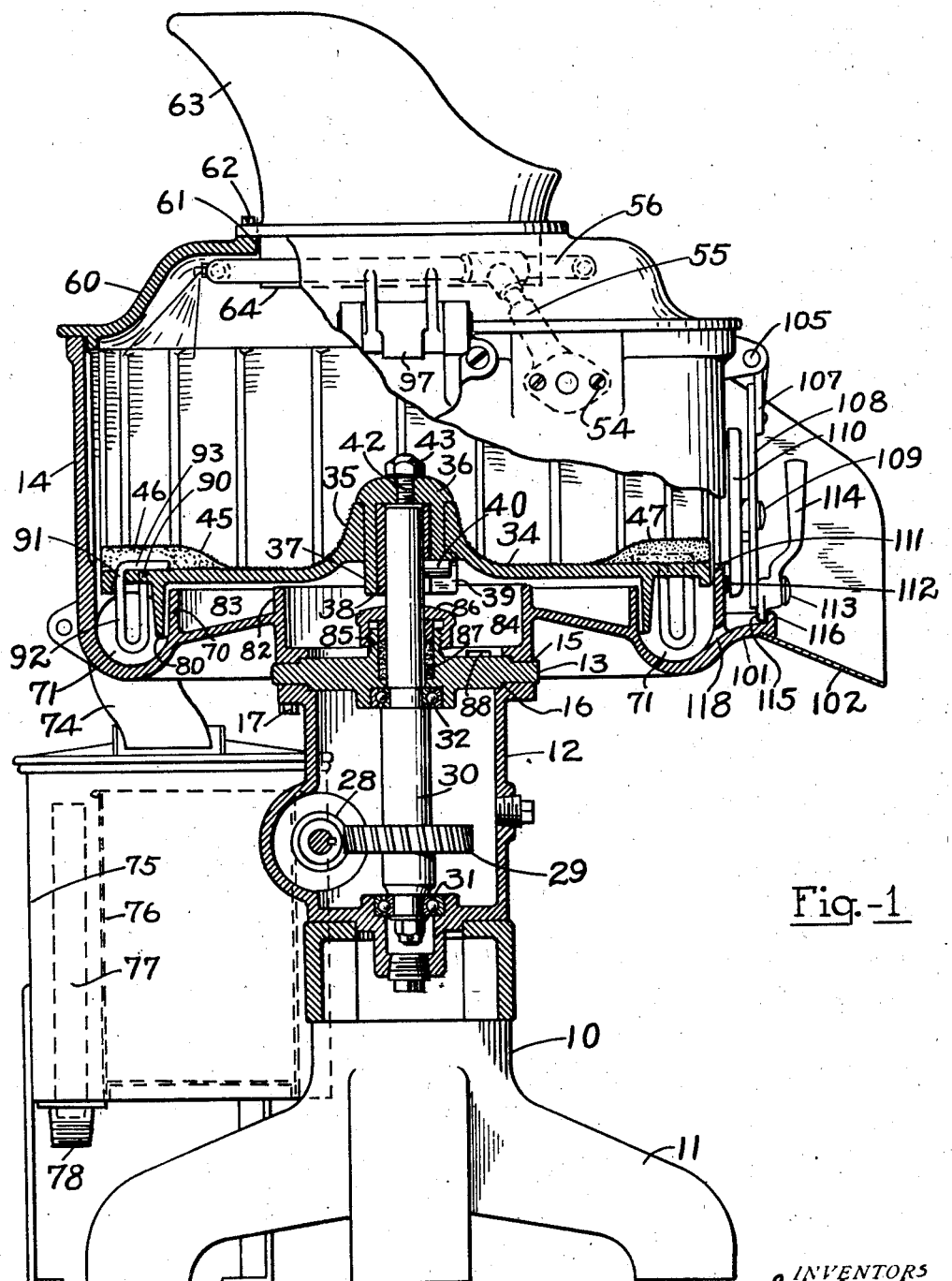

Referring to the drawings in which is disclosed a preferred embodiment of the invention, the machine comprises a pedestal having a lower portion 10 supported by a plurality of legs 11 shown to be four in number, to which is bolted a hollow casing 12, the top of which is closed by a plate 13. Mounted upon the pedestal is a container 14 having unitary side and bottom walls. The bottom wall of container 14 is formed with flange seat 15 which rests upon the corresponding flanged portion of plate 13, and the upper portion of the casing 12 is formed with similar seat 16 receiving the lower portion of the plate 13, these parts being bolted together by bolts 17.

Carried by the lower portion 10 of the pedestal is a side bracket 20 upon which is mounted an electric motor 21 having an enclosing casing to prevent ingress of water and having an extended armature shaft 22 connected through a flexible coupling 23 with a shaft 24 mounted in ball bearings 25 and 26 carried within casing 12. Shaft 24 carries a worm 28 which meshes with a worm gear 29 pinned to a vertical shaft 30 mounted in ball bearings 31 and 32 positioned within the hollow portion 12 of the pedestal, which hollow portion forms a lubricant chamber for the proper lubrication and silent operation of the parts as well as to protect the same from the ingress of water.

Figure 2:
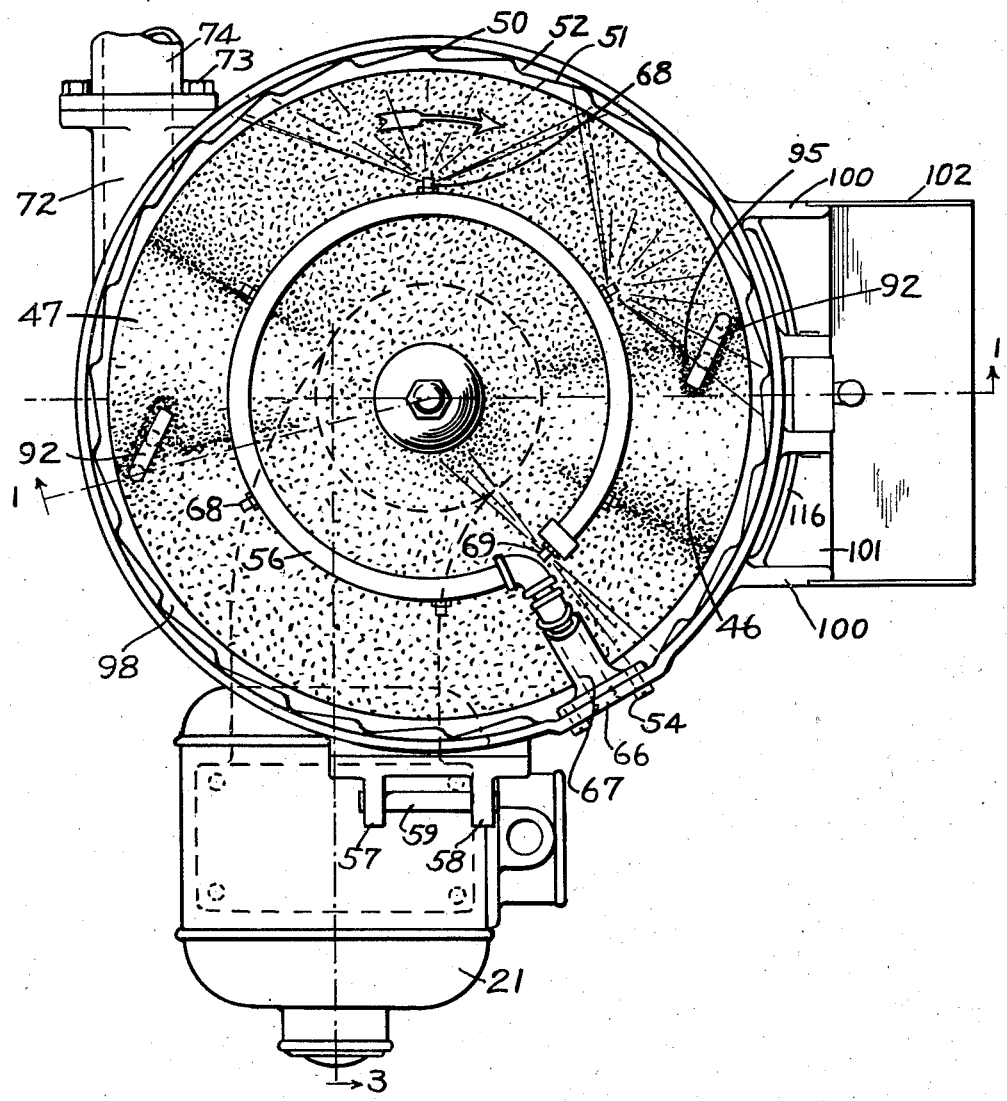
Fig. 2 is a plan view of the machine with the cover removed.

Shaft 30 extends upwardly through the closure plate 13 and through the bottom wall of container 14 into the interior thereof. A rotary peeling disk 34 is carried by the upper end of shaft 30 within container 14. As shown disk 34 is formed with a central upstanding boss 35 having a centrally arranged opening within which is fixedly mounted a plug member 36 carrying a downwardly extending annular flange 37 forming an inverted cup-shaped member. Within the cup-shaped member is a sleeve bearing 38 receiving the upper end of shaft 30. Flange 37 and bearing sleeve 38 are broken away or slotted at one side as indicated at 39 to receive a pin 40 carried by shaft 30 to connect the shaft and disk 34 in driving relationship. Disk 34 is normally readily removable from the upper end of shaft 30, but if for any reason it should stick upon the shaft there is provided through member 36 in alignment with the end of shaft 30 a threaded bore 42, within which may be threaded a bolt, the end of which will bear upon the shaft end and force the disk from its seat. Bore 42 is normally closed by a plug or screw 43. The upper surface of disk 34 is of an abrasive character, a very suitable peeling surface being provided by casting granulated carborundum indicated at 45 in the surface of the metal of the disk. The disk is preferably formed, as shown more particularly in Fig. 2, with diametrically opposed raised portions or humps 46 and 47, having their highest portions adjacent the periphery of the disk and tapering down to the plane of the flat portion of the disk toward the center thereof.

In accordance with the present invention, the side wall of the container 14 is formed with spaced non-abrasive retarding projections or ribs, the innermost edges or ridges of which are rounded. The surface of the ribbed wall is of smooth material, such as smooth metal, and is so designed as to effect retarding of the rotary movement of the vegetables within the container while permitting their free upward movement along the wall of the container. The wall is purposely designed not as an abrading or peeling wall, but as a non-abrasive wall constructed to secure the proper and free circulation of the vegetables in a manner which is found to prevent bruising of the vegetables, reduces waste to a minimum, secures more uniform peeling of mixed large and small vegetables, and eliminates the production of "flats" or flat sides on the vegetables due to excessive peeling on one portion thereof. As shown, the container 14 is formed of cast iron, and is cast with a plurality of vertical corrugations on the inner surface of the side wall. Each of these corrugations is formed with a shorter relatively steep wall 50 opposed to the direction of rotary movement of the disk 34 as indicated by the arrow in Fig. 2, and consequently opposed to the direction of rotary movement of the vegetables being treated therein. The opposite wall of each corrugation is longer and comparatively flat as indicated at 51, whereby considerable space is provided between each corrugation, and the steep walls 50 may be of substantial extent so that the vegetables are materially retarded in their rotary movement without being cut or bruised by short sharp walls or edges, while being permitted to freely move upwardly along the vertical corrugations. The ridge of each corrugation is rounded as indicated at 52 to prevent undesired cutting or bruising of the vegetables.

In operation, each vegetable is thrown outwardly across the surface of the disk 34 by centrifugal force resulting from the rotation of the disk, and upon contacting with the outer wall of the container freely mounts upwardly along this wall until the vegetable reaches substantially the top of the pile within the peeler when it tumbles back toward the center of the disk and upon the abrasive surface thereof. During its climbing movement in contact with the corrugated wall of the container, its tendency to rotate at the speed of the disk 34 is materially retarded so that when the vegetable tumbles back into contact with the disk 34 the disk moves under the vegetables at a considerably greater speed of rotation, thereby effecting the peeling of the vegetable. The corrugations in the side wall of the container preferably extend down only to a point a little above the level of the main upper surface of the disk 34, the lower ends of the corrugations being curved as shown in Fig. 1 to provide no corners or recesses in which dirt may collect. The upward movement of the vegetables tends to keep these curved portions clean; and cleaning water running down the smooth side walls of the container readily washes the feeding chips and dirt from the walls.

Fastened to the interior side wall of container 14 above disk 34 by bolts 54 is a swivel mounting 55 which supports a circular pipe coil 56. Carried by the exterior of the side wall of container 14 are spaced lugs 57 and 58 within which is fastened a pin 59 forming a pivotal support for a cover member 60 seating upon and closing the upper end of container 14. The cover is provided with a centrally arranged opening 61 about which is bolted at 62 a hopper member 63 having a depending lip portion 64 which extends downwardly through opening 61 into the interior of the peeler. If desired, the depending lip may be cast integral with or rigidly attached to cover 60. The swivel mounting 55 and pipe coil 56 are so arranged as to support the pipe coil 56 about the depending lip 64 above the lower end thereof to prevent splashing of liquid through the open hopper. As shown, the swivel mounting 55 is inclined to the horizontal at an angle of substantially 60°, so that the pipe coil 56 is supported in operative position materially above the plane of the connection of the cover 60 to container 14. Container 14 is provided with an opening 66 in alignment with the opening 67 in the swivel mounting 55, and the opening 66 is threaded to receive the threaded end of a pipe connection for supplying water thereto.

Pipe coil 56 is provided with spaced nozzles 68 which are so constructed as to throw a diffused sheet spray as shown in Fig. 1 sweeping the side wall of the container 14. The nozzles are so positioned that the spray of one joins with the spray of another at their adjacent edges, as shown more particularly in Fig. 2, so that the entire side wall of the container is swept by the spray which is directed with considerable velocity from the nozzles. Any conventional construction of nozzle for discharging such a sheet spray may be used, so the construction of the nozzle is not illustrated herein in detail. The end of the pipe coil is provided with a downwardly directed nozzle 69 which directs a diffused spray upon disk 34. The sides of the peeler and the disk are thus continually flushed with a spray of considerable intensity, and this permits a minimum amount of water to be used giving economical operation and at the same time an effective cleaning and flushing action. Inasmuch as the side wall is of smooth, non-abrasive material, this wall can be kept clean and sanitary, and objections due to fouling are eliminated.

The integral construction of the side and bottom wall of the container 14 eliminates joints which are apt to become loose and produce noise, or induce leakage. The bottom wall of the container carries an integral outer annular flange 70 defining an annular channel 71 between the side wall and the flange. The flushing water sweeping the side wall and disk, coupled with centrifugal force due to rotation of the disk, rapidly flushes the skins and refuse to the periphery of the disk and down the side wall, and thence into channel 71. This material is found to be of such a nature that it tends to clog drains and pipes, particularly where a relatively small amount of flushing water is used, or where long lengths of pipe or sharp bends are employed. In order to minimize the danger of clogging, a tangential outlet 72 is provided for channel 71, whereby the centrifugal force resulting from the rotation of the disk is utilized to assist in the removal of the refuse.

As shown, the construction of the disk 34 and its positioning with respect to the channel 71 are such that the flushing water falling upon the upper surface of the disk is thrown off during rotation of the disk with such high tangential velocity as to impart a high velocity of swirling movement to the flushing water and contained peelings, sand, grit and the like directly within the channel 71. The channel effectively blocks off this swirling material from the space about the bearings of the peeling disk. The comparatively small amount of flushing water used, as described above, is thus given such a high velocity of swirling movement at the time it reaches the channel 71 that it sweeps the peelings and other impurities directly out the tangential discharge 72 without any substantial accumulation within the channel 71, so that the machine is self cleaning in operation, and backing up or accumulation of flushing water and contained impurities in the machine is effectively restrained. Bolted to the discharge 72 by bolts 73 is a relatively short pipe length 74 discharging directly into a peeling strainer 75 having a perforate straining basket 76 therein adapted to collect the peelings, and an overflow pipe 77 connected to a suitable drain 78 for the discharge of the liquid.

Cooperating with the upstanding annular flange 70 of the bottom wall is a depending annular flange 80 formed integral with disk 34, this flange surrounding flange 70 and closely spaced thereto so as to minimize leakage. To further minimize the danger of leakage, the bottom wall is formed with an inner annular flange 82 defining a pocket or chamber 83 between flanges 70 and 82. Flange 82 extends downwardly below the bottom wall and is formed with the flange seat 15 resting upon the closure plate 13, thereby forming a chamber 84 about this portion of vertical shaft 30. Closure plate 13 is provided with an upstanding threaded flange 85 receiving thereon a cap 86 which serves to compress packing 87 positioned about shaft 30, to thus form a stuffing box arranged above the level of the bottom of chamber 84 to prevent ingress of any water into the lubricant chamber of the hollow pedestal. A port 88 is formed through the wall of chamber 84 to permit drainage of liquid therefrom.

Disk 34 is made readily removable from the machine so that it can be withdrawn for cleaning and the like. In large size peeling machines, the peeling disk is often of considerable weight, and is difficult to remove from the cylindrical confining wall of the container inasmuch as a solid grip cannot be readily secured. In accordance with the present invention, a combination handle member and channel cleaner is provided, which not only facilitates the removal of the disk but also serves to assist in the discharge of refuse from channel 71 during operation. As shown, disk 34 is provided with spaced openings 90 and 91 within which are upwardly inserted the ends of a U-shaped member or rod 92. One end 93 of the member is made longer than the other end and is bent over after being inserted through the disk to form a support for the U-shaped member which normally rests upon the surface of the disk. In this position, the major part of the U-shaped member depends within channel 71, and upon rotation of disk 34 serves to sweep refuse from the channel out the tangential discharge 72.

Several combination handle members and channel cleaners are preferably provided at diametrically opposed points adjacent the periphery of the disk, so that a finger grip or handle is provided at each side of the disk and so that the weight of the disk is balanced about the points of support, thereby enabling the disk to be readily withdrawn without objectionable tilting by the use of both hands of an operator. Each U-shaped member 92 is loosely mounted in the disk so that it can be moved upwardly relative to the disk until such movement is stopped by the lower portion of the loop contacting with the under surface of the disk. This enables a large loop forming a convenient handle to be used, while during operation of the disk the handle member rests in its lower position substantially out of the way so as not to interfere with the proper peeling action. As a further precaution, each handle member is preferably mounted immediately behind a respective hump 46 or 47, a portion of the hump being broken away as indicated at 95 to provide a groove or recess for the reception of the handle member. In operation, upon rotation of the disk 34, the humps 46 and 47 throw the vegetables upwardly so that there is little if any contact of the vegetables with the disk immediately behind the humps, the handle members thus being effectively positioned out of the path of movement of the vegetables and not interfering with the proper peeling action.

Figure 4:
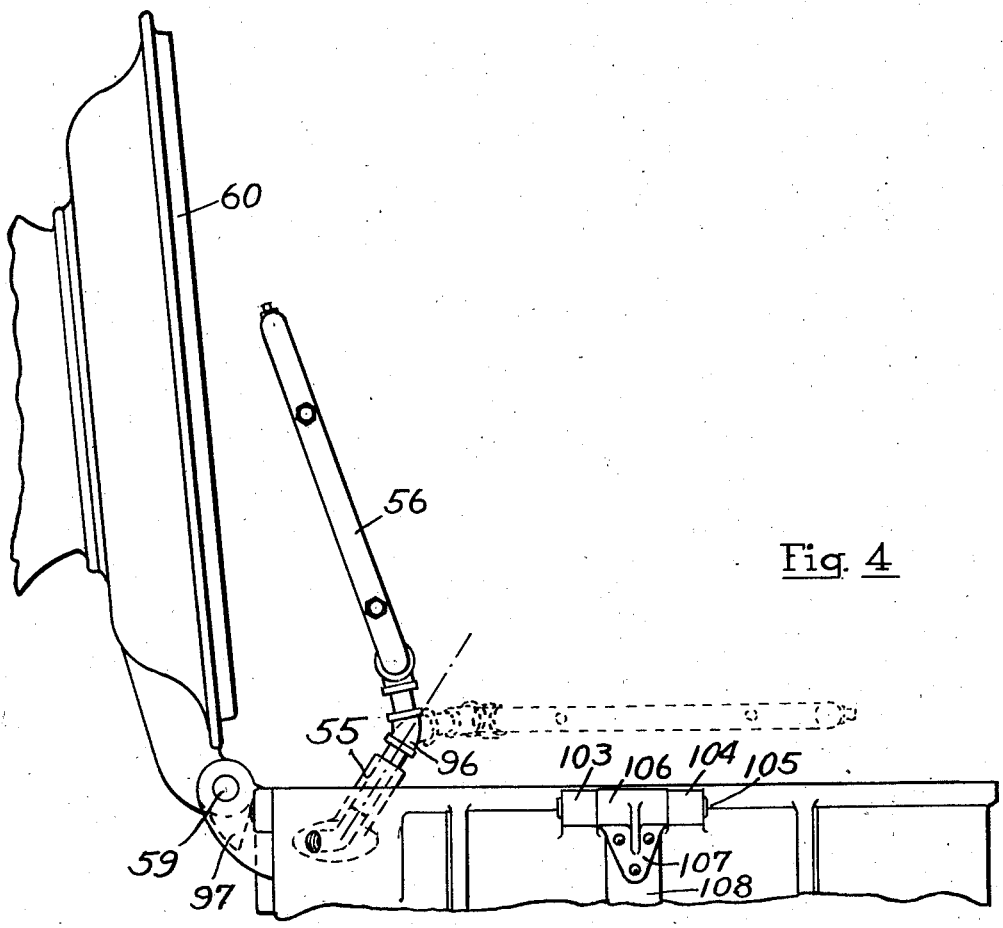
Fig. 4 is a partial side elevational view of the machine with the cover and pipe coil swung to inoperative positions.
Figure 3:
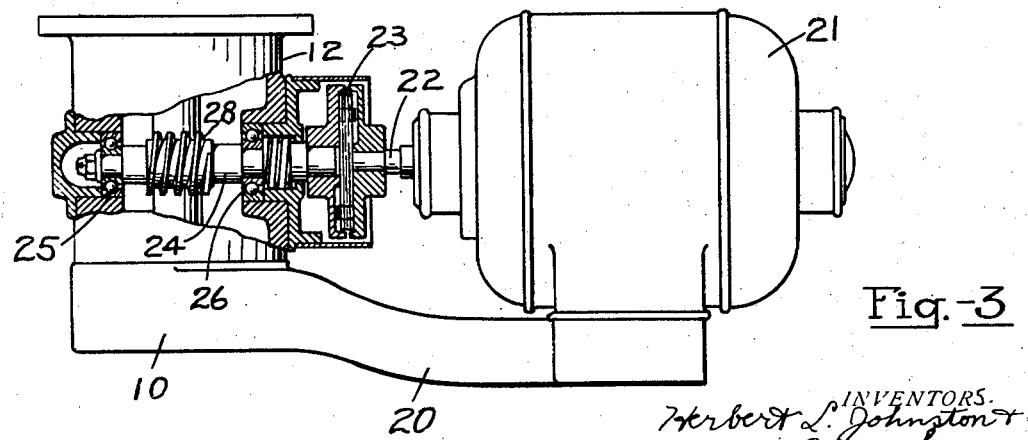
Fig. 3 is a side elevation of a portion of the machine taken at right angles to Fig. 1 showing the motor mounting, parts being broken away and in section to illustrate the driving interconnection.

To permit the removal of disk 34 and to provide ready access to the interior of the container, the cover 60 may be swung back upon its pivot pin 59 until a stop member 97 carried by the cover 60 contacts with the wall of the container. The pipe coil 56 may be swung about its swivel mounting 55 from the position shown in dotted lines in Fig. 4 to that shown in full lines. A pipe section 96 connected to coil 56 is so proportioned and curved that upon rotative movement about the swivel mounting 55 the coil moves from an approximately horizontal position overlying the center of the container to a substantially vertical position at the swivel mounting side of the container, or even inclined somewhat rearwardly over the side wall of the container so that it is out of the way. As shown clearly in Fig. 2, the external diameter of disk 34 is less than the smallest effective internal diameter of container 14 including the ribs or corrugations, so that the disk may be readily removed from the container, and ample space indicated at 98 is provided about the periphery of the disk through which peelings and refuse may be washed into discharge channel 71. The end of pipe section 96 preferably has a sliding fit within the swivel mounting which not only permits the easy swiveling movement of the coil, but also permits the entire coil 56 and pipe section 96 to be withdrawn as a unit from the mounting 55. The location of the mounting 55 within container 14 permits the use of a simple sliding fit for pipe section 96 without packing, as any leakage which may occur falls on the interior of the container and is withdrawn with the flushing liquid.

At one side of the machine, container 14 is formed with outwardly extending side flanges 100 and a bottom flange 101 to which is attached a chute 102. Container 14 is provided adjacent its upper edge spaced lugs 103 and 104 carrying a pin 105 upon which is pivotally mounted a sleeve 106 attached by an arm 107 to a strap 108 which is bolted at 109 to a door 110 closing an opening 111 in the side wall of the container. Suitable packing 112 is mounted in a peripheral groove of door 110 in a position to be compressed between the door and the wall of the container about opening 111 when the door is closed to minimize leakage. Strap 108 carries at its lower end a pin 113 upon which is rotatably mounted a handle 114 carrying a locking arm 115 having a cam surface cooperating with an upstanding flange 116 formed across the bottom wall 101, whereby the door may be cammed shut and locked securely in closed position. Flange 116 extends entirely across the bottom wall 101 forming a dam. The wall 101 slopes inwardly, and a port 118 formed through the side wall of the casting permits any leakage past door 110 to be returned to channel 71.

In operation, motor 21 is started to bring disk 34 up to speed. Water is turned on to supply coil 56, and then the vegetables are dumped into hopper 63 which discharges them into the interior of the container. In a machine of the character illustrated, generally about a minute to a minute and a half suffices for the peeling operation when potatoes are being treated, this of course depending upon the initial condition of the potatoes and their intended use. When the peeling action has proceeded long enough, the water is turned off and then handle 114 is turned and door 108 opened, the rotating disk 34 discharging the potatoes through chute 102 into a suitable container positioned to receive them, when the motor may be turned off. During the peeling operation, the skins and other refuse are flushed into channel 71 from which they are discharged through tangential outlet 72 directly into the peeling strainer 75, where the peelings are filtered out, the water being discharged to drain.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a peeling machine of the character described, a container, a rotary peeling member mounted therein, the interior side wall of said container being formed with a plurality of spaced smooth-surfaced non-abrasive retarding members extending inwardly from the said side wall a relatively short distance coordinated with a relatively close spacing of said members so as to oppose and retard the rotary movement of vegetables and the like therein without materially deflecting them toward the center and while permitting their upward movement along said wall, without substantial peeling action or cutting of the vegetables by said interior side wall, the approach side of a retarding member being shorter than the opposite side of said member.

2. In a peeling machine of the character described, a container, a rotary peeling member having an upper abrasive surface adapted to effect peeling of vegetables and the like within said container and to throw them outwardly by centrifugal force due to rotation of said member, said member having an upstanding projection on the upper surface of the member adjacent the periphery thereof to impart an upward thrust to the vegetables thereon during rotation of the member, said container having a side wall formed about its interior surface with a multiplicity of closely spaced smooth-surfaced non-abrasive corrugations extending inwardly from the side wall a comparatively small distance in substantially uniform close spacing about the interior thereof so as to retard the rotary movement of the vegetables without materially deflecting them toward the center and while permitting their upward movement along said wall in a substantially uniform manner about the periphery thereof, without substantial peeling action or cutting of the vegetables by said interior side wall.

3. In a peeling machine of the character described, a cylindrical container, a rotary peeling disk mounted therein, said disk having an upper abrasive surface adapted to effect peeling of vegetables and the like within the container and to throw them outwardly by centrifugal force due to rotation of the disk, said container having a side wall formed on its interior surface with substantially vertical smooth-surfaced non-abrasive corrugations, each of said corrugations having a relatively steep wall of comparatively small width opposed to and adapted to retard the rotary movement of the vegetables therein without materially deflecting them toward the center and while permitting their upward movement along said wall, and a comparatively flat wall on the opposite side thereof, the innermost ridge of each corrugation being rounded.

4. In a peeling machine of the character described, a container having a side wall and a bottom wall, a rotary member mounted therein, said bottom wall having an outer upstanding annular flange defining a channel between said side wall and said flange below the peripheral portion of said rotary member, said bottom wall also having an inner upstanding annular flange defining a collecting chamber between said outer and inner flanges.

5. In a peeling machine of the character described, a container having a side wall and a bottom wall, a rotary member mounted therein, said bottom wall having an outer upstanding annular flange arranged opposite said side wall and concentrically with said rotary member and closer to the periphery of the rotary member than to the center thereof, said flange defining an annular channel between said side wall and said flange below the peripheral portion of said rotary member, said rotary member having a depending annular flange concentric with and surrounding said first mentioned flange and cooperating therewith to minimize leakage.

6. In a peeling machine of the character described, a pedestal, a container having a side wall and a bottom wall mounted on said pedestal, a vertical shaft mounted in bearings in said pedestal and extending through the bottom wall into the interior of said container, a rotary member carried by said vertical shaft within said container, discharge means for liquid and peelings from the container, means separate from said discharge means forming a chamber about said vertical shaft where it enters the container, means to prevent liquid leakage from said chamber along said shaft, and means for draining leakage liquid from said chamber to the exterior of said container without passing through said discharge means.

7. In a peeling machine of the character described, a container, a rotary member mounted therein, said container having provisions defining an annular channel beneath said rotary member, and a tangential discharge for said channel.

8. In a peeling machine of the character described, a container, a rotary member mounted therein, said container having provisions defining an annular channel beneath said rotary member, a tangential discharge for said channel, and means carried by said rotary member and depending within said annular channel for assisting in the discharge of material from said channel through said tangential discharge upon rotation of said rotary member.

9. In a peeling machine of the character described having a container provided with a discharge channel, a rotary peeling member adapted to be mounted therein, and a combination handle member and channel cleaner carried by said rotary member.

10. In a peeling machine of the character described, a rotary peeling disk having a raised portion thereon, and a handle member mounted in said disk immediately behind said raised portion with reference to the direction of rotation of said disk.

11. In a peeling machine of the character described, a rotary peeling member having spaced openings therethrough, a handle member formed of a bent rod having the ends thereof inserted upwardly and loosely through said openings, one of said ends being bent over to form a supporting surface normally resting on said rotary member.

12. In a peeling machine of the character described, a container, a rotary member mounted therein, a cover member for said container having an inner opening therein, a hopper carried by said cover about said inner opening, a depending lip extending downwardly about said inner opening below the adjacent portion of said cover and providing a feeding inlet from said hopper into the container, and a pipe coil for supplying water to the interior of said container positioned beneath said cover and surrounding said depending lip.

13. In a peeling machine of the character described, a cylindrical container, a rotary peeling disk mounted therein having an upper abrasive surface with spaced projections thereon adapted to effect peeling of vegetables and the like within the container and to throw them outwardly by centrifugal force due to rotation of the disk and to impart an upward thrust to the vegetables due to the projections thereon, said container having a non-abrasive side wall formed on its interior surface with a multiplicity of upright smooth-surfaced non-abrasive retarding projections arranged about the periphery of the container in such closely spaced relation as to secure a substantially uniform retardation and upward movement of the vegetables about the periphery of the container, the said projections extending inwardly from the side wall a relatively short distance so as to oppose and retard the rotary movement of the vegetables without materially deflecting them toward the center and while permitting their upward movement along the wall without substantial peeling action or cutting of the vegetables by said interior side wall.

14. In a peeling machine of the character described, a container having side and bottom walls, a rotary member mounted therein, an upstanding projection on said bottom wall defining an annular channel between said side wall and said projection below the peripheral portion of said rotary member, a discharge outlet from said annular channel, and a member carried by the peripheral portion of said rotary member and depending within said annular channel for effecting a sweeping and circulating action of material within said annular channel.

15. In a peeling machine of the character described, a pedestal, a container having a side wall and a bottom wall mounted on said pedestal, a vertical shaft mounted in bearings in said pedestal and extending through said bottom wall into the interior of said container, a rotary disk carried by said vertical shaft within said container, said bottom wall having an outer upstanding annular flange defining a channel between said side wall and said flange below the peripheral portion of said disk, said bottom wall also having an inner annular flange defining a chamber about said vertical shaft, a stuffing box for said shaft to prevent leakage from said chamber along said shaft, an outlet for said annular channel, and means for draining leakage liquid from said chamber.

16. In a peeling machine of the character described having a liquid supply, a hollow pedestal, said pedestal having a removable closure plate for the upper end thereof provided with a shaft receiving opening, a container having side and bottom walls mounted on said pedestal, said bottom wall having an opening closed by said removable closure plate, a vertical shaft extending up through said shaft receiving opening in the removable closure plate into the interior of said container, a rotary member carried by said shaft within said container, bearings for said vertical shaft within said hollow pedestal below said closure plate, a stuffing box for the portion of said shaft passing through said closure plate, and means for restraining the ingress of the liquid to the space immediately surrounding said shaft and stuffing box.

17. In a peeling machine of the character described having a container provided with a discharge channel, a rotary peeling member adapted to be mounted therein, and a handle member movably mounted in said rotary member and adapted to normally depend into said discharge channel to assist in the expelling of material from said channel, said handle member being movable to provide a finger grip to facilitate removal of the rotary member from said container.

18. In a peeling machine of the character described, a rotary peeling disk having diametrically opposed humps adjacent the periphery thereof, and diametrically opposed handle members mounted in said disk immediately behind said humps with reference to the direction of rotation of said disk, each of said handle members being adapted to be normally supported by said disk substantially out of the path of movement of vegetables and the like being treated by the disk.

19. In a peeling machine of the character described, a container, a rotary member mounted therein adapted to be removed upwardly from said container, a cover member for said container having a centrally arranged opening, a hopper carried by said cover about said opening and having a lip depending within said opening beneath the adjacent portion of said cover, said cover being pivoted to said container, a pipe coil within said container beneath said cover and surrounding said depending lip for supplying water thereto, and a swivel mounting for said pipe, whereby the cover carrying the hopper may be swung about its pivot mounting and the water pipe may be moved about its swivel mounting so as to permit upward removal of said rotary member from the container, the hopper lip depending within said pipe coil when the parts are in normal operating position.

20. A peeling machine as set forth in claim 13, characterized by the fact that the side wall curves inwardly so that the projections terminate somewhat above the level of the upper abrasive surface of the disk between the spaced projections thereon, the cylindrical side wall of the container below the projections being smooth surfaced.

21. In a peeling machine of the character described, a container, a rotary peeling member therein, bearing means for said rotary peeling member, said container having provisions defining an annular channel beneath the peripheral portion of said rotary member and blocked off from said bearings, means for supplying a flushing liquid within said container and onto said rotary member, the said rotary member being so constructed and cooperatively positioned with respect to said annular channel as to discharge the flushing liquid together with contained peelings and impurities from the rotary member with a high velocity of swirling movement within said annular channel, and a tangential discharge from said annular channel whereby the rapidly swirling flushing water with contained impurities sweeps out the tangential discharge without substantial accumulation within the channel.

In testimony whereof we hereto affix our signatures.

HERBERT L. JOHNSTON.
DAVID A. MEEKER.